No. 670,656. Patented Mar. 26, 1901.
C. R. BANNIHR.
MACHINE FOR MAKING MATCHES.
(Application filed Jan. 22, 1900.)
(No Model.) 6 Sheets—Sheet 1.

Fig. 1.

Witnesses:
Inventor,
Caesar R. Bannihr,
by Samuel W. Balch
Attorney.

No. 670,656.  
Patented Mar. 26, 1901.

C. R. BANNIHR.

MACHINE FOR MAKING MATCHES.

(Application filed Jan. 22, 1900.)

(No Model.)

No. 670,656. Patented Mar. 26, 1901.
C. R. BANNIHR.
MACHINE FOR MAKING MATCHES.
(Application filed Jan. 22, 1900.)
(No Model.) 6 Sheets—Sheet 4.

Witnesses
Chas. L. Curtis
Frederick Recht

Inventor,
Caesar R. Bannihr,
by Samuel W. Balch
Attorney.

No. 670,656. Patented Mar. 26, 1901.
C. R. BANNIHR.
MACHINE FOR MAKING MATCHES.
(Application filed Jan. 22, 1900.)
(No Model.) 6 Sheets—Sheet 5.

Witnesses:

Inventor,
Caesar R. Bannihr,
by Samuel W. Balch
Attorney.

No. 670,656.  
C. R. BANNIHR.  
MACHINE FOR MAKING MATCHES.  
(Application filed Jan. 22, 1900.)  
Patented Mar. 26, 1901.

(No Model.)  
6 Sheets—Sheet 6.

Witnesses:  
Chas. L. Curtis  
Frederick Recht

Inventor,  
Caesar R. Bannihr,  
by Samuel W. Balch  
Attorney.

THE NORRIS PETERS CO., PHOTO-LITHO., WASHINGTON, D. C.

UNITED STATES PATENT OFFICE.

CAESAR R. BANNIHR, OF NEW YORK, N. Y., ASSIGNOR OF ONE-HALF TO CHARLES L. CURTIS, OF BROOKLYN, NEW YORK.

MACHINE FOR MAKING MATCHES.

SPECIFICATION forming part of Letters Patent No. 670,656, dated March 26, 1901.

Application filed January 22, 1900. Serial No. 2,285. (No model.)

*To all whom it may concern:*

Be it known that I, CAESAR R. BANNIHR, a citizen of the United States of America, and a resident of the city, county, and State of New York, have invented certain new and useful Improvements in Machines for Making Matches, of which the following is a specification.

These improvements may be embodied in varied types of match-machines, although they are illustrated in connection with a machine the operation of which is as follows: The match-splints are cut from a strip of veneer with its grain running in the direction of its width. This veneer has a width equal to the length intended for the matches and a thickness equal to the thickness intended for the matches. This is fed to the machine and is cut by a series of parallel knife-blades into square match-splints. The ends of these splints are engaged by a slide with a notched end and transferred to an endless conveyer-chain with alternate splints projecting from each side of the chain. The links of this chain are guide-frames with stacks of parallel plates, between which the match-splints are clamped while they are being conveyed by the chain to the devices which coat the ends with paraffin and the igniting composition. The match-splints after being coated and dried, thus making them into matches, are returned by the chain to the machine, and a second slide pushes the matches out from between the plates and transfers them to the boxes in which they are packed.

In the accompanying six sheets of drawings, which form a part of this specification.

A main shaft 1, suitably driven, actuates intermittently and in proper time the feed-rolls for feeding the strips of veneer to the machine, the knife-blades for separating the veneer into match-splints, the splint-transferring slide for transferring the splints to the plates of the conveyer-chain, the conveyer-chain, and the match-ejecting slide which transfers the completed matches from the chain to the boxes. Each revolution of the shaft completes a number of matches sufficient for one layer in the boxes into which they are delivered from the machine.

Figure 4:
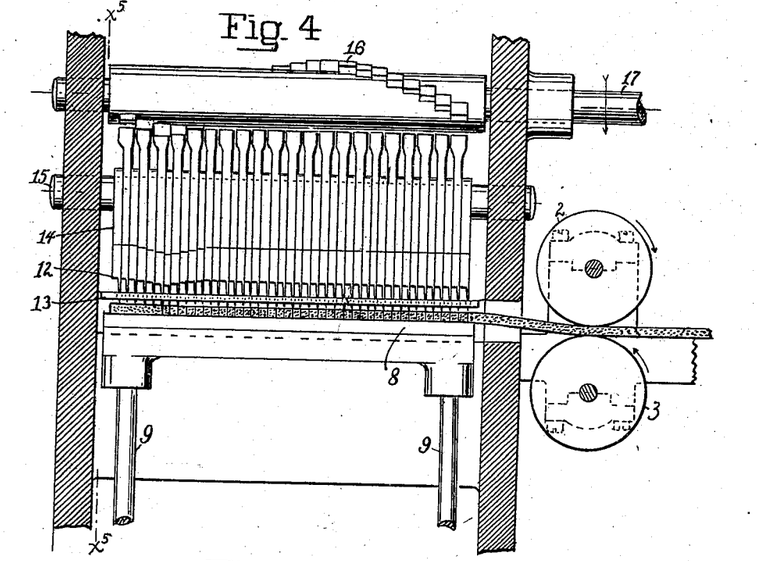
Fig. 4 is a section on the line $x^4 x^4$ of Fig. 5, drawn to about full size and showing the mechanism for cutting the match-splints.
Figure 5:
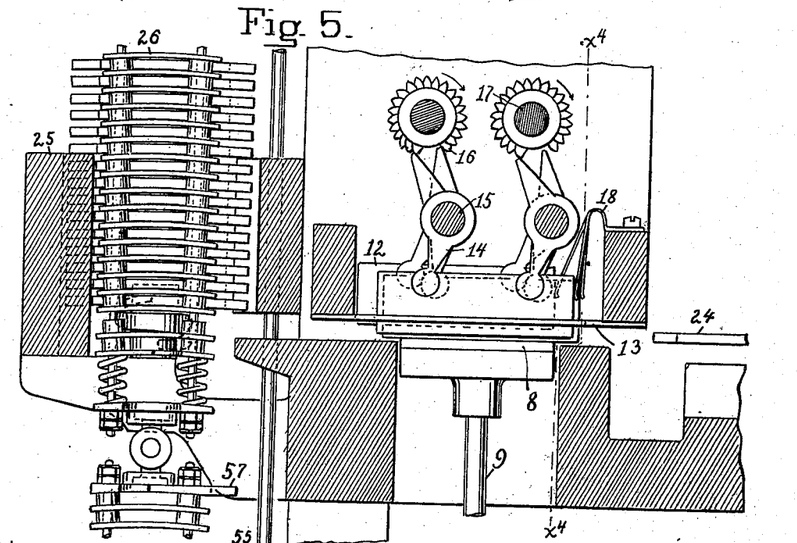
Fig. 5 is a section on the line $x^5 x^5$ of Fig. 4, drawn to about full size and showing the mechanism for cutting the match-splints, together with a portion of the chain of holding-plates.
Figure 6:
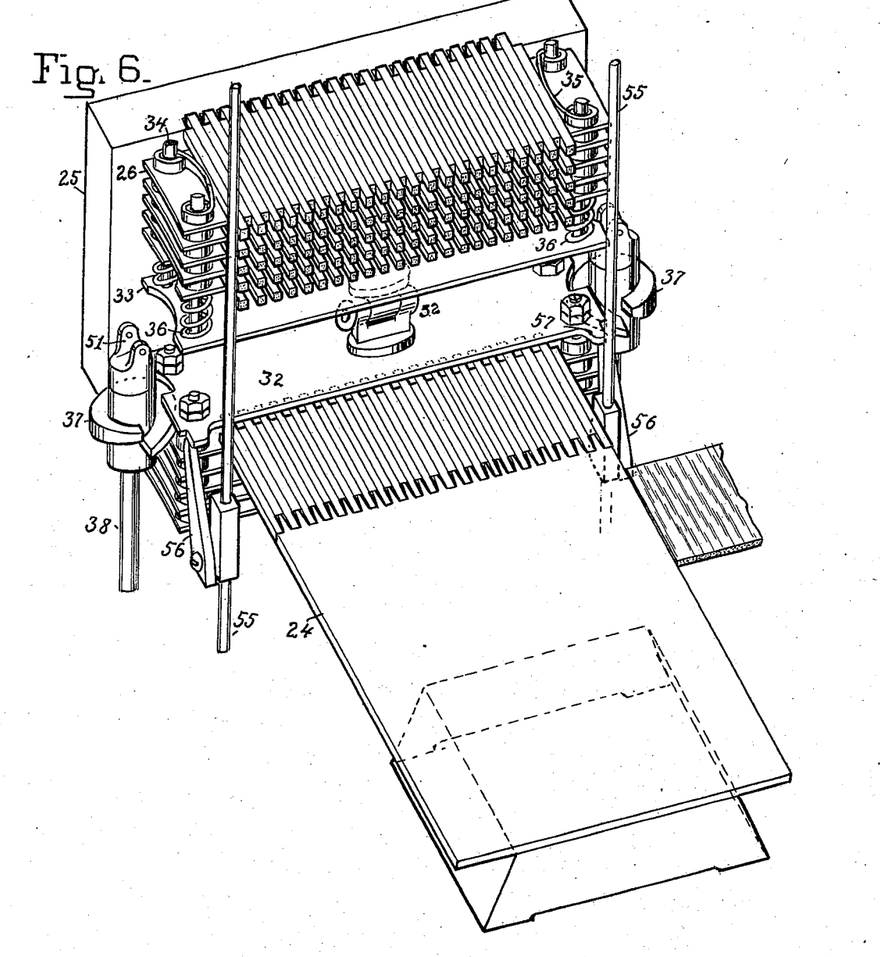
Fig. 6 is a perspective view showing the splint-transferring slide, a portion of the chain of holding-plates, and the mechanism for feeding the chain and separating the plates for the introduction of the splints.

The strip of veneer from which the match-splints are cut is fed to the machine between feed-rolls 2 3. These are geared together by gears 4 5 and are driven intermittently from the main shaft by the engagement of the gear-segment 6 with the spiral gear 7 on the shaft with one of the feed-rolls. The gear-segment has pin-teeth and is carried by the main shaft. The circumference of the rolls is such that one revolution will feed in the length of veneer which is requisite for one layer of matches in the box into which the matches are delivered, and, since the pins in the gear-segment are the same in number as the grooves in the spiral gear, it follows that each engagement of the gear-segment with the spiral gear will effect one revolution of the feed-rolls. It is obvious that the requisite amount of veneer could be fed by rolls of any other diameter by properly proportioning the driving-gearing. The veneer feeds onto a cutting-table 8, which is carried by rods 9. The lower ends of these rods are pinned to levers 10, which rest on cams 11. These cams give to the table a slight vertical movement, the purpose of which will be discussed later. The veneer is cut into match-splints on this table by a series of parallel knife-blades 12. When the table is raised, the blades pass through slots in a stripper-plate 13. Each of these blades is jointed to the ends of two rocker-arms 14, mounted on rods 15. The blades cut into the veneer with an oblique or draw-cut movement, thereby making a more even separation of the splints than would be produced by a vertical cut. The joints between the blades and the rocker-arms are made without the use of pin connections, the ends of the rocker-arms are formed into a circle joined to the arms by a narrow neck, and the circular ends are fitted into holes the edges of which cut through the top edges of the blades. The blades are actuated through these rocker-arms. One of the arms for each blade is extended above the fulcrum-rods 15 and is engaged by a cam 16 on the cam-shaft. Each blade is actuated by a separate cam, and these are spirally arranged on two shafts 17, so that they will successively engage the rocker-arms and operate the blades one after another. It is convenient to mount the cams on two shafts, since more space lengthwise on the shafts can be allotted to each cam and the contact-surfaces of the cams made wider. The spiral lines along which the cams are placed do not quite encircle the shafts, and there is therefore a point in the revolution at which none of the cams will be in engagement with the rocker-arms and all of the blades will be retracted by their springs 18. The cam-shafts are actuated through bevel-gears 19 and pinions 20 from a shaft 21. The gears and pinions are in the ratio of four to one. On the shaft 21 is a spiral gear 22 with four spiral grooves. This is engaged by what may be termed a "gear-segment" 23, although it has but one pin-tooth. With each revolution of the main shaft this spiral gear is therefore moved a fourth of a revolution and the cam-shafts one revolution. This movement is intermittent and so timed that it immediately follows the feeding in of the veneer. After the veneer has been separated into match-splints on the cutting-table and while the cutting-table is in its raised position the splints are engaged by a transferring-slide 24. The end of this slide is notched, with the notches opposite every other splint. The slide pushes the row of splints from the cutting-table, the ends of the splints being engaged alternately by the teeth and notches on the end of the slide. The splints are pushed by the slide through a passage-way which is even with the cutting-table in its raised position against a notched guide 25, the notches of which are similarly spaced to the notches on the slide. The notches in the guide are opposite the teeth in the slide. Between the guide and the slide are parallel plates 26, between which the splints are held while being coated with the igniting composition. Owing to the coöperation of the notched slide and the notched guide, the splints are transferred to the plates with alternate splints projecting from each side. The splint-transferring slide is operated from the main shaft through a bent lever, one arm 27 engaging the slide and the other arm 28 having a groove which is engaged by a crank-pin 29, which is revolved by the main shaft. The groove in the lever is curved, the curvature corresponding to the circle in which the crank-pin travels. In consequence the crank-pin imparts to the lever and slide a slow forward movement with a quick return, followed by a period of rest. As soon as the splints have been transferred sufficiently toward the plates to no longer require the support of the cutting-table the latter is lowered by the cams 11, which are rocked through the lever 30 and link 31, connecting with the lever-arm 27. Immediately on the lowering of the cutting-table the veneer can be fed onto the table without waiting for the complete removal of the splints previously cut and the return of the splint-transferring slide. In this way the operations requisite for the preparation of a second layer of splints can be sooner initiated and the output of the machine increased. When the slide has fully returned, the cutting-table is again lifted and another layer of splints is cut from the veneer.

The parallel plates for receiving the match-splints are in a stack in a guide-frame, consisting of an upper plate 32 and a lower plate 33, connected by rods 34. The upper plate is one of the splint-holding plates. The stack of plates, with the exception of the top one, slide on the rods. They are spaced apart by bowed springs 35, which leave an opening between adjoining plates just sufficient for the layer of match-splints formed at each revolution of the machine. Springs 36, between the lowest plate of the stack and the lowest plate of the guide-frame, hold all the plates of the stack in their normally-spaced positions. The distance apart which the plates are normally spaced by the bowed springs is slightly greater than the thickness of the splints, but the plates are slightly curved, one side being concave and the other convex, and the splints, when held between the plates, are bent slightly, so that the elasticity of each splint will serve to hold it in place between the plates. The splints, which are slightly under size, are consequently properly clamped by the plates along with thicker splints, which may be between the same plates. The bowed springs press against the ends of the layers of splints between the plates and also clamp and hold the splints. Two means for holding the splints are thus provided, but either may be dispensed with if desired. It will be seen that the plates are so mounted in the guide-frame that any two adjoining plates can be spread apart and the opening between them increased at will. So doing will force downward all the plates below, when the opening between the plates is increased. The ends of the plates are engaged by two worms 37, which are used to feed the plates and increase the opening between them while the splints are being inserted. These worms are not carried quite once around the shafts 38. They are somewhat irregular spirals. At their middle points they are carried partly around these shafts in a circle, and the ends only lie on a spiral. These middle portions of the worms are slightly wider than the normal space between the plates, and consequently while they are in engagement the space between the plates is increased beyond their normal opening, and the plates are not advanced. This takes place between each pair of adjoining plates as they come opposite the splint-transferring slide and the splints are being transferred to the plates by the slide. This transfer takes place while the worms are revolving, but there is no advance of the stack of plates, since the circular instead of the spiral part of the worm-thread is in engagement with the plates.

The worms are driven from the main shaft and make one revolution in the same time as the main shaft, but their movement is intermittent, while the movement of the main shaft is continuous.

The worm-shafts are driven from the main shaft by a train of gearing. This consists first of the spur-pinion 39, the idler-wheel 40, and the gear 41. The latter revolves at half the speed of the main shaft, and on the shaft with it is a wheel 42, carrying two teeth which engage the notched wheel 43. With each revolution of the main shaft one of the teeth is brought into engagement with the notched wheel, and since there are five notches in the wheel it is moved each time a fifth of a revolution. From the shaft of this wheel are driven the bevel-gears 45 and the bevel-pinions 46. These are in the ratio of five to one, the same as the number of notches in the notched wheel. Hence each engagement of a tooth of the two-toothed wheel with the five-notched wheel 43 will effect one revolution of the bevel-gears 45 and through them will revolve the pinions 46 one complete revolution, and they through the shafts 50 and universal joints 51 impart a revolution to the worms.

The operation has been described as though but a single guide-frame with its stack of plates. The machine may be operated in this way and the frames taken from the machine by hand for the purpose of dipping the splints in the ignition composition and holding the matches until the composition is dry. The drawings, however, show a continuously-operating match-machine in which a series of guide-frames are hinged together by hinges 52 and made into an endless conveyer-chain.

Figure 7:
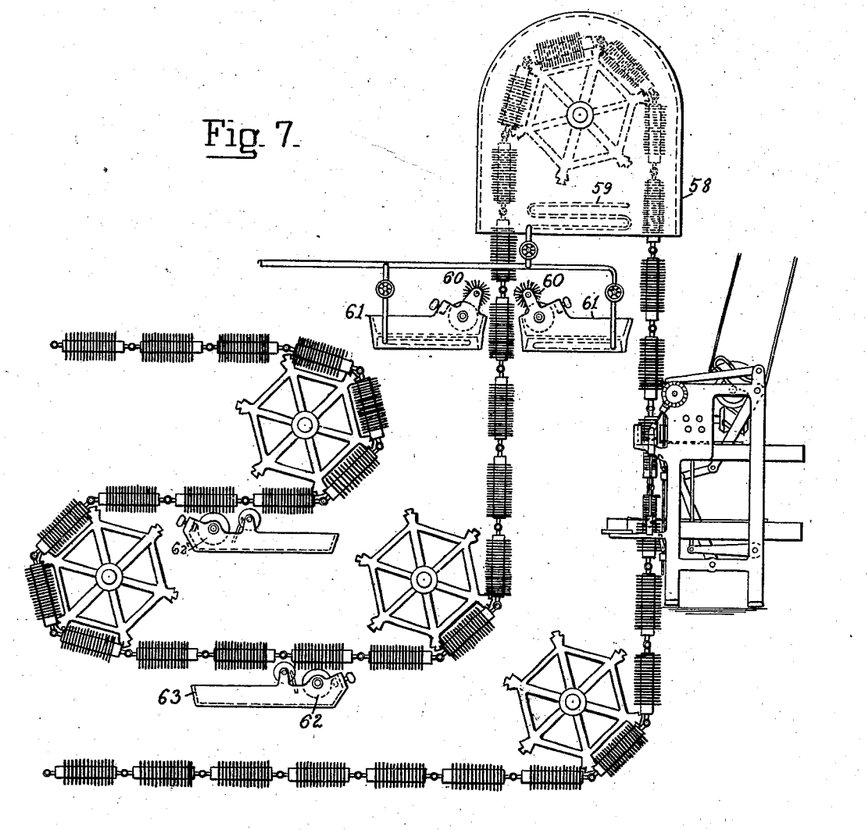
Fig. 7 is a side view, drawn to about one-eighth size, showing the machine as in Fig. 1, together with the chain conveyer, the means for warming the splints, for brushing the ends of the splints with paraffin, and for coating the ends with the igniting composition.
Figure 8:
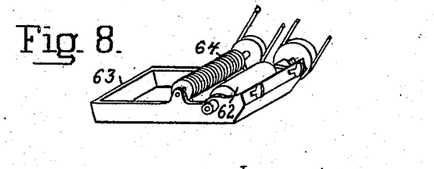
Fig. 8 is a perspective view of one of the pans for the igniting composition, together with the coating-roll and a series of disks, which play between the matches and prevent the accidental joining of two matches with the composition.

The revolution of the worms, as has already been stated, is intermittent. They stop when the spiral ends of the worms are turned toward the plates. The upper plate 32 is cut away, so that it will not be engaged by the lower spiral ends of the worms when in this position, and the lowest plate of the stack is likewise cut away, but so that it will not be engaged by the upper spiral ends of the worms when the worms are in the position in which they stop. The lower plate 33 of the guide-frame is cut away, so as to entirely clear the worms. It will be seen, therefore, that when the worms stop after engagement with the space between the two lowest plates of a stack the lowest plate of the stack, the lower plate of the guide-frame, and the upper plate of the following guide-frame will pass the worms, and the chain can be fed forward by other means, so that the next movement of the worms will engage and open the space between the two highest plates of the following guide-frame. Such means for moving the chain independently of the worms are provided in the machine. They consist in the cam 53, levers 54, rods 55, and pawls 56, which engage with projections 57 on each guide-frame. The pawls move up and down at each revolution of the main shaft of the machine; but there is but one pair of projections on each guide-frame, and the pawls are so positioned relatively to them that they will be engaged only at the proper time for shifting from one guide-frame to the following guide-frame. At each revolution of the main shaft of the machine the chain of guide-frames is moved forward sufficiently to bring the next succeeding space for holding splints opposite the splint-transferring slide, whether the next succeeding space be in the same guide-frame or in the following guide-frame. The splints are carried by the conveyer-chain first through a warming-chamber 58, which is heated by steam-coils 59. From this they are carried to revolving brushes 60, which are saturated with paraffin from the paraffin-pans 61 and coat the ends of the splints with paraffin. There is a paraffin-brush for applying paraffin on each side of the conveyer-chain, since alternate splints are carried in the conveyer-chain with their ends projecting from one side and the ends of the intermediate splints project from the opposite side. The brushes are revolved in any suitable manner. After the ends have been thus coated with paraffin the splints are carried by the conveyer-chain over a roller 62, which runs in a pan 63, containing ignition composition. This coats the splints which project from one side with composition. The conveyer-chain next passes over a pulley, and the splints which project from the opposite side are carried over a second roller 62', which coats these splints with composition. In order to prevent the composition from bridging between matches the ends of which are near each other in the conveyer-chain, the coated ends are carried between clearing-wheels 64 immediately after coating.

Figure 1:
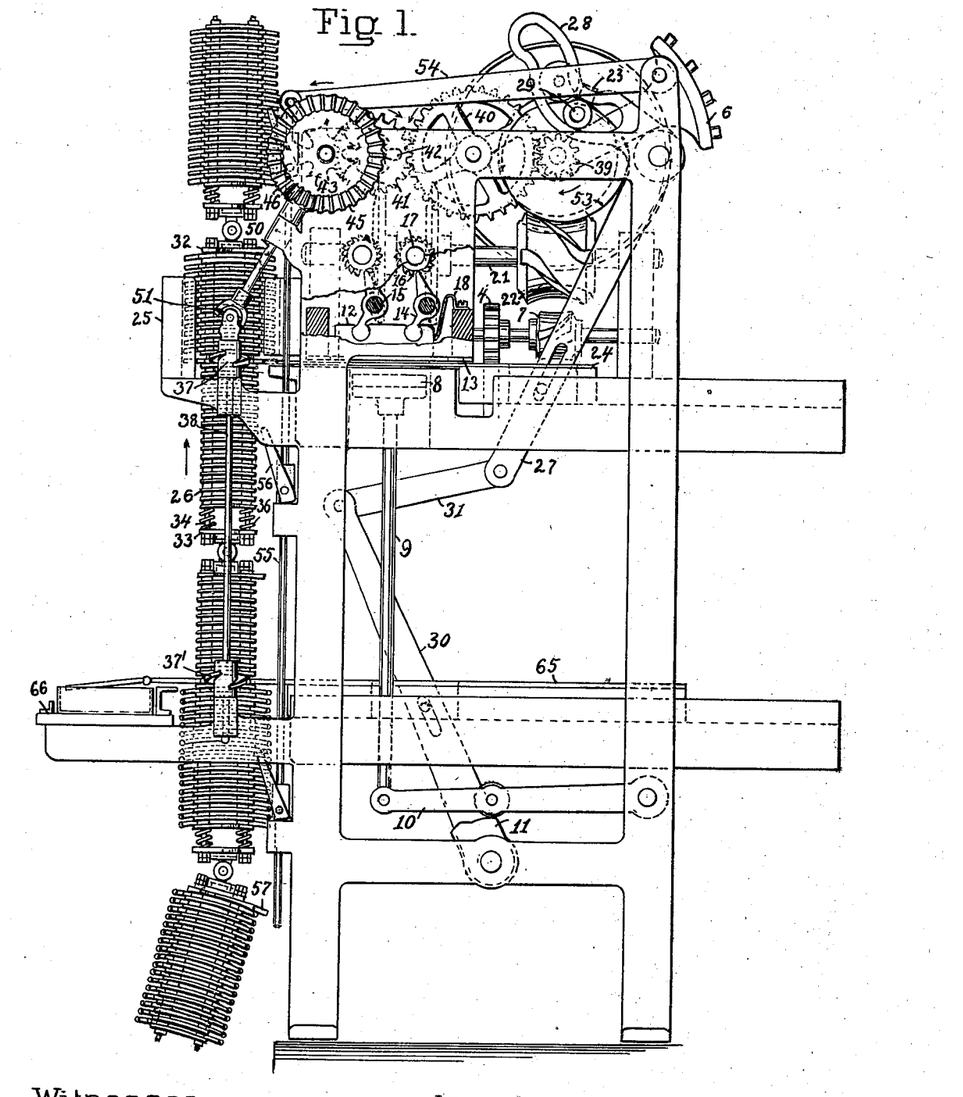
Figure 1 is a side view of the machine, drawn to about half size, showing the mechanism for cutting the match-splints from a strip of veneer and transferring them to the chain of holding-plates and also the mechanism for removing the matches from the holding-plates to the boxes, the frame opposite the cutting mechanism being broken away.
Figure 2:
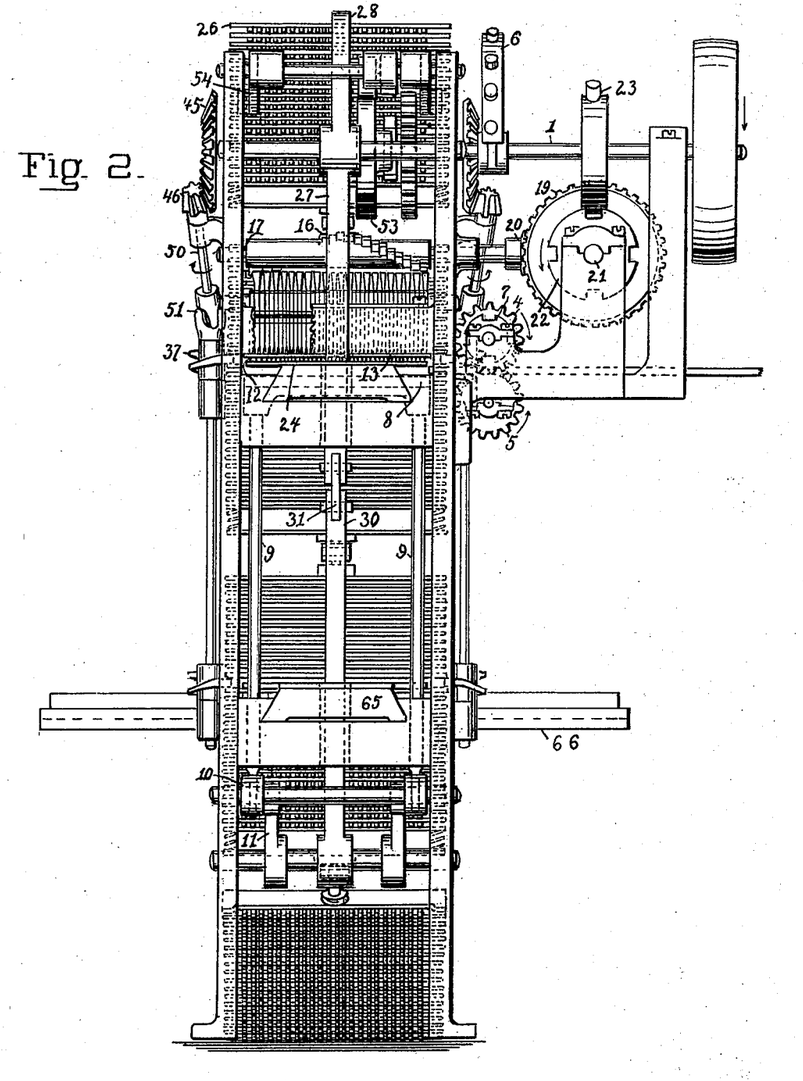
Fig. 2 is an end view of the same.
Figure 3:
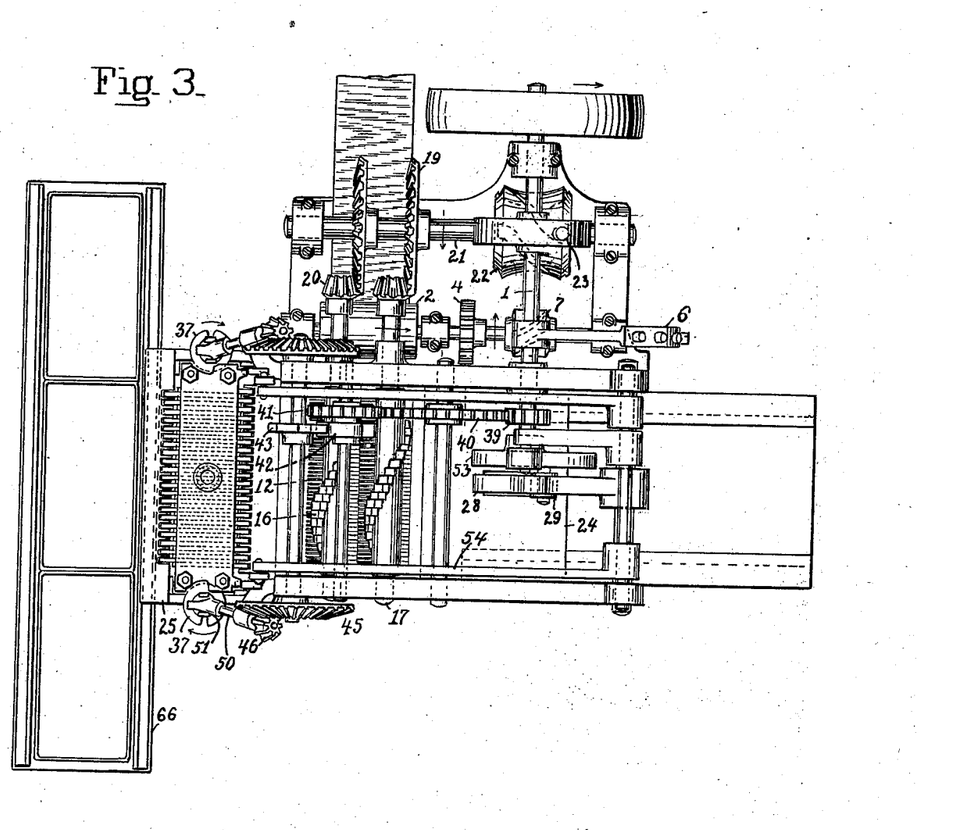
Fig. 3 is a top view of the same.

These wheels are narrow disks of metal suitably spaced so that the match ends can pass between them. They are mounted on a revolving shaft and kept clean by a doctor-blade. After the matches have thus been made they are carried by the conveyer-chain for a sufficient length of time to dry. They are then returned at the bottom of the machine and pass in front of a match-ejecting slide 65, which passes between the plates and pushes the matches, a layer at a time, into boxes on the table 66. As the matches come opposite the match-ejecting slide the plates are engaged and the opening increased between them by worms 37' in the same way that the plates were opened by the worms 37, as already described. The worms 37' are on the same shafts with the worms 37. Both pairs of worms operate together, but on the plates in different guide-frames. Since the guide-frames are in the same chain, they operate on corresponding plates in the guide-frames, for the chain must be fed alike at both points and the feeding mechanisms must operate in unison. The splint-transferring slide and the match-ejecting slide likewise operate at the same time opposite the corresponding openings between the plates of different guide-frames.

Since the structure is such that the plates and openings between the plates maintain the same position in each guide-frame whether filled with splints or partly filled or empty, it follows that an opening in one of the guide-frames can be brought into register with the splint-transferring slide, by which it is filled with splints at the same time that the corresponding opening in another guide-frame of the chain is brought into register with the match-ejectign slide.

Where necessary, the conveyer-chain may be guided by rails which engage the corners of the plates.

What I claim as new, and desire to secure by Letters Patent of the United States, is—

1. In a match-machine, the combination with a cutting-table for a strip of veneer, of a series of flat parallel knife-blades with sockets open at the sides and backs of the blades, parallel cutting edges for the blades, rocker-arms which are jointed in the sockets and guide the blades in an oblique movement to and from the table, and a series of cams for successively operating each of the blades with a draw-cut movement, substantially as described.

2. In a match-machine, the combination with a cutting-table for a strip of veneer, of a series of parallel knife-blades with parallel cutting edges, supports for the blades which guide them in an oblique movement to and from the table, and a series of cams mounted on two shafts for successively operating the blades, the cams for adjoining blades being on separate shafts and provided with working faces which are wider than the distance between the blades, substantially as described.

3. In a match-machine, the combination with a cutting-table for a strip of veneer, of means for intermittently feeding a strip of veneer onto the table, a series of parallel knife-blades with parallel cutting edges, supports for the blades which guide them in a movement to and from the table, a series of cams for successively operating the blades, means for intermittently removing splints from the table, and a train of intermittently-actuated gearing for operating the cams, substantially as described.

4. In a match-machine, the combination with a cutting-table for a strip of veneer, of means for raising and lowering the table, means for feeding a strip of veneer onto the table, a series of parallel knife-blades operating in conjunction with the table in its raised position for transversely separating the strip of veneer into match-splints, a passage-way for the splints leading from the raised position of the table, a splint-transferring slide, and means for successively feeding the veneer, raising the table, operating the blades, transferring the splints and lowering the table, substantially as described.

5. In a match-machine, the combination with a cutting-table for a strip of veneer, of cams for raising and lowering the table, means for feeding a strip of veneer onto the table, a series of parallel knife-blades operating in conjunction with the table in its raised position for transversely separating the strip of veneer into match-splints, a passage-way for the splints leading from the raised position of the table, a splint-transferring slide, means for operating the blades, a lever for operating the slide, and connections between the lever and the cams for raising and lowering the table, substantially as described.

6. In a match-machine, the combination with means for intermittently feeding a strip of veneer, of a cutting-table for the veneer, a series of parallel knife-blades for transversely separating the strip of veneer into match-splints, cams for operating the blades, a train of gearing for operating the cams, which includes an intermittently-actuated spiral gear, a splint-transferring slide, a lever for operating the slide, a curved groove in the lever, a crank-pin engaging the groove, and a main shaft from which are operated the means for feeding the veneer, the train of gearing for operating the cams, and the crank-pin, substantially as described.

7. In a match-machine, the combination in a guide-frame consisting of end plates connected by rods, of a stack of parallel plates between the parallel faces of which match-splints are received, the plates being so mounted on the rods that the opening between any two adjoining plates may be increased at will, means independent of the match-splints for determining the space between the plates, and compression-springs on the rods for holding all the plates in their normally-spaced positions, substantially as described.

8. In a match-machine, the combination with a stack of parallel plates for receiving rows of match-splints between the parallel faces thereof, of springs for clamping the ends of the rows of splints, substantially as described.

9. In a match-machine, the combination with a stack of parallel plates for receiving match-splints, of bowed springs between the plates for spacing the plates and for clamping the splints independently of the plates, substantially as described.

10. In a match-machine, the combination in a guide-frame of a stack of parallel plates for receiving match-splints so mounted that the opening between any two adjoining plates may be increased at will, means for spacing the plates, springs for holding all the plates in their normally-spaced positions, and springs between the plates for clamping the splints independently of the plates, substantially as described.

11. In a match-machine, a conveyer-chain for match-splints, each link of which comprises in combination a guide-frame, a stack of parallel plates between the parallel faces of which the match-splints are received, the plates being so mounted that the opening between any two adjoining plates may be increased at will, means independent of the match-splints for determining the space between the plates, a set of springs for holding all the plates in the stack in their normally-spaced positions, means for successively filling the openings between the plates in one link with match-splints, means for successively emptying the splints from another link, and means for feeding the chain, substantially as described.

12. In a match-machine, a conveyer-chain for match-splints, with a stack of parallel plates in each link thereof, worms in engagement with the plates, notches in the end plates of the stack whereby they can pass the worms without engagement therewith, means for operating the worms, and means independent of the worms for feeding the conveyer-chain when the worms are disengaged from the plates, substantially as described.

13. In a match-machine, a conveyer-chain for match-splints, igniting-composition-applying devices, clearing-wheels with continuous peripheries operating between the matches, and a doctor-blade for the clearing-wheels, substantially as described.

Signed by me in New York city, borough of Manhattan, State of New York, this 15th day of January, 1900.

CAESAR R. BANNIHR.

Witnesses:
SAMUEL W. BALCH,
FRANK H. VILLIE.